US008717986B2

(12) United States Patent
Noh et al.

(10) Patent No.: US 8,717,986 B2
(45) Date of Patent: May 6, 2014

(54) APPARATUS AND METHOD FOR DETERMINING MIMO/DSM OPERATING MODE

(75) Inventors: Won Jong Noh, Yongin-si (KR); Yung Yi, Daejeon (KR); Tae Soo Kwon, Hwaseong-si (KR); Soo Hwan Lee, Gyeongsan-si (KR); Chang Yong Shin, Seoul (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 468 days.

(21) Appl. No.: 12/939,709

(22) Filed: Nov. 4, 2010

(65) Prior Publication Data

US 2011/0194594 A1 Aug. 11, 2011

(30) Foreign Application Priority Data

Feb. 9, 2010 (KR) ........................ 10-2010-0011919

(51) Int. Cl.
*H04W 4/00* (2009.01)
*H04B 1/00* (2006.01)
*H04B 15/00* (2006.01)
*H04B 17/00* (2006.01)
*H04B 1/04* (2006.01)
*H04B 1/10* (2006.01)

(52) U.S. Cl.
USPC .... 370/329; 455/63.1; 455/67.13; 455/114.2; 455/296

(58) Field of Classification Search
USPC ........... 370/328, 329; 455/63.1, 67.13, 114.2, 455/296
See application file for complete search history.

(56) References Cited

U.S. PATENT DOCUMENTS

| 2006/0003703 | A1* | 1/2006 | Yahagi ............................ 455/69 |
| 2006/0019694 | A1* | 1/2006 | Sutivong et al. ............... 455/522 |
| 2007/0191066 | A1 | 8/2007 | Khojastepour et al. |
| 2007/0218950 | A1 | 9/2007 | Codreanu et al. |
| 2008/0002733 | A1 | 1/2008 | Sutskover |
| 2008/0165877 | A1 | 7/2008 | Guo et al. |
| 2009/0129499 | A1 | 5/2009 | Kwak et al. |
| 2010/0197338 | A1* | 8/2010 | Bonneville et al. ........... 455/522 |

FOREIGN PATENT DOCUMENTS

| KR | 10-2009-0003092 | | 1/2009 | |
| KR | 10-2009-0042991 | | 5/2009 | |
| KR | 2009/134093 | * | 11/2009 | ............ H04W 72/12 |
| WO | WO2009120118 | * | 10/2009 | ............... H04B 7/06 |
| WO | WO2009133916 | * | 11/2009 | ............... H04J 11/00 |
| WO | WO 2009/136736 | * | 11/2012 | ............... H04B 7/04 |

\* cited by examiner

*Primary Examiner* — Ronald Abelson
(74) *Attorney, Agent, or Firm* — NSIP Law

(57) ABSTRACT

Provided is a data transmission system that may determine a multiple input multiple output dynamic spectrum management (MIMO-DSM) operation mode of a base station based on information associated with a data transmission route and a computational capability of each base station. A terminal may generate feedback information based on a cooperation level between base stations and may transmit the generated feedback information to a serving base station. The serving base station may select terminals that may receive data from among a plurality of terminals through a MIMO-DSM algorithm and a user scheduling based on the feedback information.

28 Claims, 8 Drawing Sheets

APPARATUS AND METHOD FOR DETERMINING MIMO/DSM OPERATING MODE

CROSS-REFERENCE TO RELATED APPLICATION(S)

This application claims the benefit under 35 U.S.C. §119(a) of Korean Patent Application No. 10-2010-0011919, filed on Feb. 9, 2010, in the Korean Intellectual Property Office, the entire disclosure of which is incorporated herein by reference for all purposes.

BACKGROUND

1. Field

The following description relates to an interference control method that decreases an effect of an interference signal transmitted to a terminal.

2. Description of Related Art

An amount of signals transmitted via a wireless communication network has been gradually increasing over time. In the near future, the amount of signals transmitted via the wireless communication network will increase several times. The wireless communication network may include a plurality of base stations and a plurality of terminals. A terminal may receive an interference signal from an adjacent base station adjacent to a base station that transmits a desired signal. The interference signal may decrease transmission efficiency in the wireless communication network, and thus, a method for decreasing or minimizing the interference is desired.

SUMMARY

In one general aspect, there is provided a cooperation base station, including: a feedback information generating unit configured to generate feedback information associated with a first terminal accessing the cooperation base station, based on information associated with a data transmission route between the cooperation base station and a serving base station adjacent to the cooperation base station or based on a computational capability of the serving base station, and a transmitting unit configured to transmit the feedback information to the serving base station, wherein the serving base station is configured to transmit, based on the feedback information, data to a second terminal accessing the serving base station.

The cooperation base station may further include that the information associated with the data transmission route includes: information associated with a bandwidth of the data transmission route between the cooperation base station and the serving base station, or transmission delay information associated with the data transmission route.

The cooperation base station may further include that the feedback information generating unit is further configured to generate a codebook-based precoding matrix index (PMI) of the first terminal as the feedback information in response to the bandwidth being narrower than a predetermined bandwidth.

The cooperation base station may further include that the feedback information generating unit is further configured to generate channel state information (CSI) associated with the first terminal as the feedback information in response to the bandwidth being wider than a predetermined bandwidth.

The cooperation base station may further include that the feedback information generating unit is further configured to generate a codebook-based PMI of the first terminal as the feedback information in response to the computational capability of the serving base station being less than a predetermined capability.

The cooperation base station may further include that the feedback information generating unit is further configured to generate CSI associated with the first terminal as the feedback information in response to the computational capability of the serving base station being greater than or equal to a predetermined capability.

The cooperation base station may further include that the feedback information generating unit is further configured to: classify the serving base station into one cooperation level among a plurality of cooperation levels based on the information associated with the data transmission route or the computational capability of the serving base station, and generate the feedback information based on the cooperation level.

The cooperation base station may further include that the cooperation base station includes a femto base station configured to transmit data to the first terminal based on a portion of radio resources among radio resources allocated to the serving base station.

The cooperation base station may further include that the serving base station includes a femto base station configured to transmit data to the second terminal based on a portion of radio resources among radio resources allocated to the cooperation base station.

In another general aspect, there is provided a serving base station, including: a receiving unit configured to receive, from a cooperation base station adjacent to the serving base station, feedback information associated with a first terminal configured to access the cooperation base station, an operation mode determining unit configured to determine an operation mode with respect to a second terminal configured to access the serving base station, based on information associated with a data transmission route between the cooperation base station adjacent to the serving base station and the serving base station, or based on a computational capability of the serving base station, and a transmitting unit configured to transmit data to the second terminal based on the determined operation mode.

The serving base station may further include that the information associated with the data transmission route includes: information associated with a bandwidth of the data transmission route between the cooperation base station and the serving base station, and transmission delay information associated with the data transmission route.

The serving base station may further include that the feedback information is generated by averaging information associated with the first terminal for more than a predetermined amount of time in response to a transmission delay being less than a predetermined delay.

The serving base station may further include that the feedback information is generated by averaging information associated with the first terminal for less than a predetermined amount time in response to a transmission delay being greater than a predetermined delay.

The serving base station may further include that the feedback information includes a codebook-based precoding matrix index (PMI) of the first terminal in response to the bandwidth being narrower than a predetermined bandwidth.

The serving base station may further include that the feedback information comprises channel state information (CSI) associated with the first terminal in response to the bandwidth being wider than a predetermined bandwidth.

The serving base station may further include that the operation mode is configured to apply an interference control scheme to the second terminal to transmit data to the second terminal.

The serving base station may further include that the interference control scheme includes a multiple input multiple output (MIMO) scheme or a dynamic spectrum management (DSM) scheme.

The serving base station may further include that the operation mode determining unit is further configured to control a period of applying the MIMO scheme and DSM scheme based on the information associated with the data transmission route, or based on the computational capability.

The serving base station may further include that: the serving base station is classified into one cooperation level among a plurality of cooperation levels based on the information associated with the data transmission route or the computational capability, and the operation mode determining unit is further configured to determine an operation mode with respect to the second terminal based on the cooperation level.

The serving base station may further include that the operation mode determining unit is further configured to select, based on the feedback information, a terminal to receive the data from among a plurality of second terminals.

The serving base station may further include that the receiving unit is further configured to receive, from the cooperation base station, information associated with the data transmission route or information associated with a cooperation level of the cooperation base station.

In another general aspect, there is provided a method of transmitting data, the method including: receiving, from a cooperation base station adjacent to a serving base station, feedback information associated with a first terminal accessing the cooperation base station, determining an operation mode with respect to a second terminal accessing the serving base station, based on information associated with a data transmission route between the serving base station and the cooperation base station adjacent to the serving base station, or based on computational capability of the serving base station, and transmitting data to the second terminal based on the operation mode.

The method may further include that the information associated with the data transmission route includes: information associated with a bandwidth of the data transmission route between the cooperation base station and the serving base station, or transmission delay information associated with the data transmission route.

The method may further include that the feedback information includes a codebook-based precoding matrix index (PMI) of the first terminal in response to the bandwidth being narrower than a predetermined bandwidth.

The method may further include that the feedback information includes channel state information (CSI) associated with the first terminal in response to the bandwidth being wider than a predetermined bandwidth.

The method may further include that the operation mode applies an interference control scheme to the second terminal to transmit the data to the second terminal.

The method may further include that the interference control scheme includes a to multiple input multiple output (MIMO) scheme or a dynamic spectrum management (DSM) scheme.

The method may further include that the transmitting includes controlling a period of applying the MIMO scheme or the DSM scheme based on the information associated with the data transmission route, or based on the computational capability.

The method may further include that: the serving base station is classified into one cooperation level among a plurality of cooperation levels, based on the information associated with the data transmission route or based on the computational capability, and the determining includes determining an operation mode with respect to the second terminal based on the cooperation level.

The method may further include that the determining includes selecting a terminal to receive the data from among a plurality of second terminals, based on the feedback information.

Other features and aspects may be apparent from the following description, the drawings, and the claims.

Figure 1A:
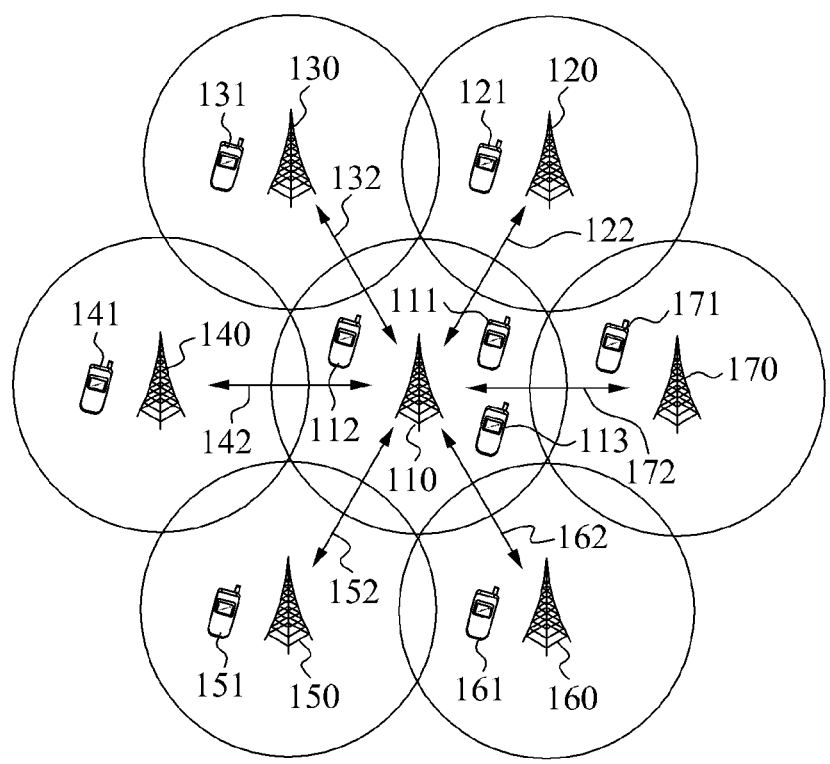
FIGS. 1A and 1B are diagrams illustrating examples of transmitting feedback information based on information associated with a data transmission route between base stations or based on a computational capability of a serving base station.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses and/or systems described herein. Accordingly, various changes, modifications, and equivalents of the systems, apparatuses and/or methods described herein may be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

FIG. 1A illustrates an example of transmitting feedback information based on information associated with a data transmission route between base stations or based on a computational capability of a serving base station 110.

One or more cooperation base stations 120, 130, 140, 150, 160, and 170 may be located around the serving base station 110. A data transmission route between base stations is referred to as a "backhaul link." Terminals 111, 112, and 113 accessing the serving base station 110 may receive signals from the cooperation base stations 120, 130, 140, 150, 160, and 170, and from the serving base station 110.

Interference signals that the terminals 111, 112, and 113 accessing the serving base station 110 receive from the cooperation base stations 120, 130, 140, 150, 160, and 170 may decrease a communication performance between the terminals 111, 112, and 113 with the serving base station 110.

The serving base station 110 and the cooperation base stations 120, 130, 140, 150, 160, and 170 may decrease an effect of the interference signals that the terminals 111, 112, and 113 receive from the cooperation base stations 120, 130, 140, 150, 160, and 170.

For example, the serving base station 110 may receive first channel state information (CSI) between the serving base station 110 and terminals 121, 131, 141, 151, 161, and 171 of the cooperation base stations 120, 130, 140, 150, 160, and 170 via data transmission routes between the serving base station 110 and the cooperation base stations 120, 130, 140, 150, 160, 170. Also, the serving base station 110 may receive second state information between the cooperation base stations 120, 130, 140, 150, 160, 170 and the terminals 121, 131, 141, 151, 161, and 171, respectively.

The serving base station 110 may calculate an effect, on the terminals 121, 131, 141, 151, 161, and 171, of an interference signal of the serving base station 110. Similarly, each of the cooperation base stations 120, 130, 140, 150, 160, and 170 may calculate an effect, on the terminals 111, 112, and 113, of an interference signal of each of the cooperation base stations 120, 130, 140, 150, 160, and 170.

The serving base station 110 and the cooperation base stations 120, 130, 140, 150, 160, and 170 may determine an operation mode to minimize an interference effect on the terminals 111, 112, 113, 121, 131, 141, 151, 161 and 171 included in corresponding to adjacent base stations.

For example, the terminals 121, 131, 141, 151, 161 and 171 respectively corresponding to the cooperation base stations 120, 130, 140, 150, 160, and 170 may estimate channel states between the terminals 121, 131, 141, 151, 161 and 171 and the serving base stations 110, and may feed back the estimated CSI to the cooperation base stations 120, 130, 140, 150, 160, and 170. The cooperation base stations 120, 130, 140, 150, 160, and 170 may transmit the CSI to the serving base station via the data transmission routes 122, 132, 142, 152, 162, and 172. The serving base station 110 may determine the operation mode based on the CSI.

According to an embodiment, the data transmission routes 122, 132, 142, 152, 162, and 172 between the serving base station 110 and the cooperation base stations 120, 130, 140, 150, 160, and 170 may be physically connected, e.g., via a wire or cable. In this case, a bandwidth of a data transmission route may be significantly wide and a transmission delay of the data transmission route may be significantly short. The serving base station 110 may promptly receive relatively accurate CSI from the cooperation base stations 120, 130, 140, 150, 160, and 170, and may calculate relatively accurate amount of interference based on the CSI. Each of the base stations 110, 120, 130, 140, 150, 160, and 170 may precisely control interference to a terminal corresponding to another base station. The serving base station 110 may control interference to each of the terminals 121, 131, 141, 151, 161, 171 based on a relatively short period.

Conversely, when the data transmission route is wirelessly connected, the bandwidth of the data transmission route may be significantly narrow and the transmission delay of the data transmission route may be significantly long. In this case, the serving base station 110 may receive more approximate CSI from the cooperation base stations 120, 130, 140, 150, 160, and 170. CSI received by the serving base station 110 is received with a relatively long transmission delay, and thus, the CSI may not indicate a current channel state. An amount of the interference calculated by the serving base station 110 may be relatively inaccurate. Each of the base stations 110, 120, 130, 140, 150, 160, and 170 may approximately control interference to terminals corresponding to other base stations. The serving base station 110 may determine an operation mode with respect to the terminals 111, 112, and 113 based on a simple algorithm. The serving base station 110 may determine the operation mode with respect to the terminals 111, 112, and 113 based on a relatively longer period.

The serving base station 110 may perform complicated calculation to determine the operation mode. For example, the serving base station 110 may calculate an effect of interference to the terminals 121, 131, 141, 151, and 161 based on a complex equation.

When the serving base station 110 is a macro base station, the serving base station 110 may have a sufficient computational capability for determining the operation mode. In this case, the serving base station 110 may promptly calculate effects of interference of all possible operation modes to determine an optimal operation mode.

When the serving base station 110 is a femto base station subject to the macro base station, the serving base station may have insufficient computational capability for the calculation. In this case, the serving base station 110 may approximately calculate the effect of interference based on the simple algorithm to determine the operation mode.

According to an embodiment, the serving base station 110 may classify each of base stations into one cooperation level among a plurality of cooperation levels based on information associated with a data transmission route with each of cooperation base stations 120, 130, 140, 150, 160, and 170, and based on information associated with a computational capability of each of the cooperation base stations 120, 130, 140, 150, 160, and 170.

Each of the cooperation base station 120, 130, 140, 150, 160, and 170 may generate feedback information associated with each terminal based on the cooperation level of the serving base station 110. As an example, when a data transmission route between the serving base station 110 and the first cooperation base station 120 is physically connected, e.g., via wire or cable, and the serving base station 110 has a sufficient computational capability, the cooperation level of the serving base station 110 may be high. When the cooperation level of the serving base station 110 is high, the first cooperation base station 120 may generate, as feedback information, CSI reflecting a latest channel state or detailed channel information associated with the first terminal 121.

According to another embodiment, when the data transmission route between the serving base station 110 and the first cooperation base station 120 is wirelessly connected and a computational capability is insufficient, the cooperation level of the serving base station 110 may be low. In this case, the first cooperation base station 120 may generate, as the feedback information, CSI reflecting a previous channel state or approximate channel information associated with the first terminals 121.

According to an embodiment, a short-term CSI or a long term CSI may be used as the detailed CSI, and a short-term precoding matrix index (PMI) or a long-term PMI may be used as the approximate CSI.

The short-term CSI or the short-term PMI may be an example of the CSI reflecting the latest channel state. The long-term CSI or the long term PMI may be used as the CSI reflecting the previous channel state.

Each of the cooperation base stations 120, 130, 140, 150, 160, and 170 may transmit the generated feedback information to the serving base station 110. The serving base station 110 may determine a detailed operation mode based on the feedback information.

The operation mode may be configured by combining at least one interference control scheme. A first operation mode may be a mode to apply a first interference control scheme to the terminals 111, 112, and 113, a second operation mode may be a mode to apply a second interference control scheme to the terminals 111, 112, and 113, and a third operation mode may be a mode to apply the first interference control scheme and the second interference control scheme to the terminals 111, 112, and 113.

According to another embodiment, an operation mode with respect to each of the terminals 111, 112, 113 may be separately determined The operation mode may be applied to the first terminal 111, and the second operation mode may be applied to the terminal 112.

A multiple input multiple output (MIMO) scheme, an interference alignment (IA) scheme, and a dynamic spectrum management (DSM) scheme may be used as the interference control scheme. These are nonlimiting examples.

For example, in response to the serving base station 110 determining an operation mode of simultaneously applying the MIMO scheme and the DSM scheme to the first terminal 121, the serving base station 110 may determine, based on the feedback information, a period of applying the MIMO scheme and the DSM scheme. The controlling of the period of applying the MIMO scheme and the DSM scheme will be described in detail with reference to FIG. 3.

Figure 1B:
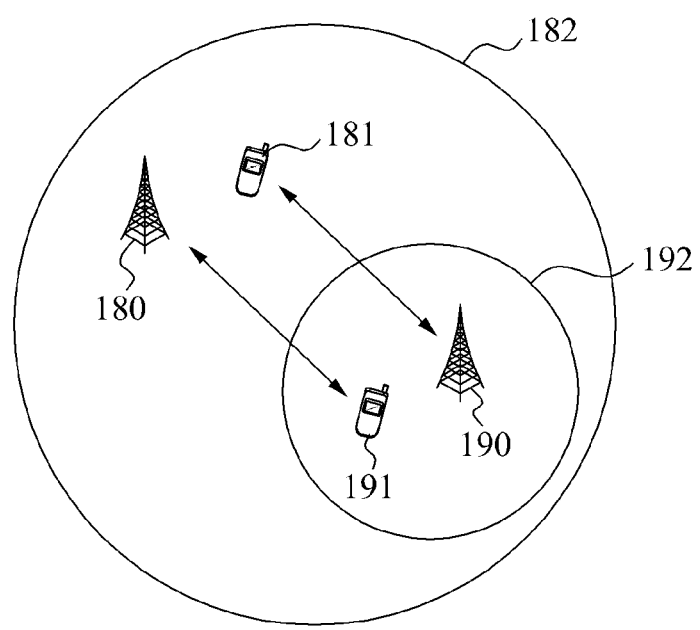

FIG. 1B illustrates an example of transmitting feedback information based on information associated with a data transmission route between a master base station 180 and a femto base station 190 or based on a computational capability of the master base station 180 or the femto base station 190.

The femto base station 190 may be a subordinate base station of the master base station 180, and may transmit data based on radio resources that may not be used by the master base station 180 among available radio resources or may transmit data based on radio resources weakly affecting data transmission of the master base station 180. A coverage 192 of the femto base station 190 may be included in a coverage 182 of the master base station 180. Accordingly, a terminal 191 located in the coverage 192 of the femto base station 190 may receive a strong interference signal from the master base station 180. A terminal 181 located in the coverage 182 of the master base station 180 may receive an interference signal from the femto base station 190.

Referring to FIG. 1B, when the femto base station 190 is subordinate to the master base station 180 and transmits data, to the terminal 191, using a portion of radio resources allocated to the master base station 180, the master base station 180 and the femto base station 190 may be in a hierarchical relationship.

According to an embodiment, the data transmission route between the femto base station 190 and the master base station 180 may be a wireless data transmission route. In this case, a bandwidth between the femto base station 190 and the master base station 180 may be significantly narrow, and a transmission delay of the data transmission route may be significantly short. The master base station 180 may determine an operation mode with respect to the terminal 181 in the same manner as the embodiment described with respect to the FIG. 1A. The femto base station 190 may also determine an operation mode with respect to the terminal 191.

Also, it may be presumed that the master base station 180 has sufficient computational capability for determining the operation mode and the femto base station 190 has insufficient computational capability for determining the operation mode. In this case, the master base station 180 may promptly calculate effects of interference of all operative operation modes to determine an optimal operation mode.

Conversely, the femto base station 190 may approximately calculate an effect of interference based on a simple algorithm to determine an operation mode.

The interference control scheme may be applied to a macro cell environment of FIG. 1A and to a hierarchical cell environment of FIG. 1B. When the interference control scheme is applied to the master base station 180 and the femto base station 190 environment, performance may be highly improved.

Although applying of the interference control scheme to the macro cell environment will be described with reference to FIGS. 2 through 7, the interference control scheme may similarly be applied to the hierarchical cell environment.

Figure 2:
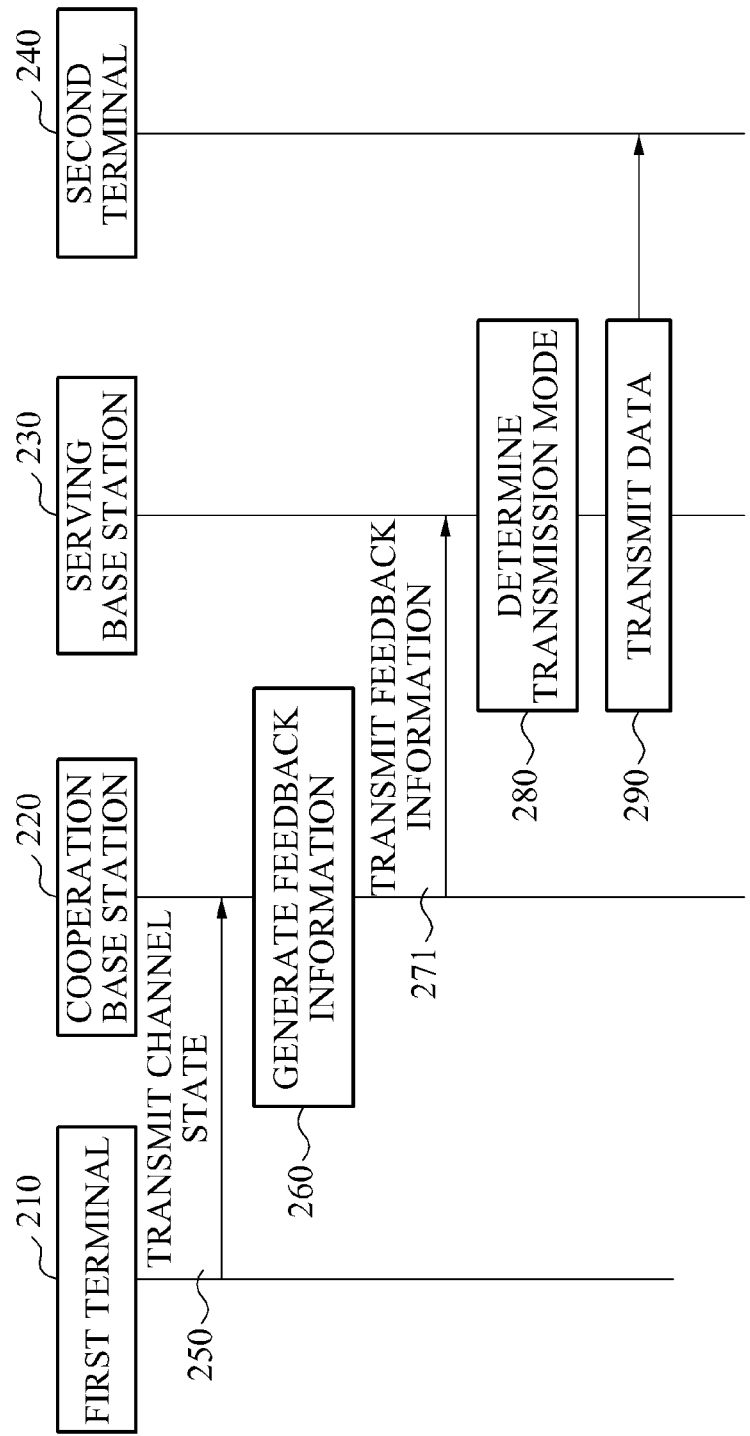
FIG. 2 is a flowchart illustrating an example of a method of transmitting feedback information based on information associated with a data transmission route between base stations.

FIG. 2 illustrates an example of a method of transmitting feedback information based on information associated with a data transmission route between base stations.

In operation 250, a first terminal 210 may estimate a channel between a cooperation base station 220 and the first terminal 210, and may transmit the estimated channel state to the cooperation base station 220. Although the illustrated first terminal 210 corresponds to the cooperation base station 220, the first terminal 210 may be a terminal that may receive an interference signal from a serving base station 230.

The cooperation base station 220 may transmit a pilot signal to the first terminal 210, and the first terminal 210 may estimate the channel between the cooperation base station 220 and the first terminal 210 based on the pilot signal.

In operation 260, the cooperation base station 220 may generate feedback information.

According to an embodiment, the cooperation base station 220 may generate the feedback information based on information associated with a data transmission route between the cooperation base station 220 and the serving base station 230. In response to a transmission delay of the data transmission route between the cooperation base station 220 and the serving base station 230 being less than a predetermined delay, the serving base station 230 may determine an operation mode with respect to each of terminals 210 and 240 based on a most recent channel state. In this case, the cooperation base station 220 may generate short-term CSI or short-term PMI as feedback information.

In response to the transmission delay of the data transmission route between the cooperation base station 220 and the serving base station 230 being greater than the predetermined delay, the serving base station 230 may determine the operation mode with respect to each of the terminals 210 and 240 based on a relatively old channel state. In this case, the cooperation base station 220 may generate long-term CSI or long-term PMI CSI as the feedback information.

According to another embodiment, the cooperation base station 220 may generate the feedback information based on a bandwidth of the data transmission route. For example, in response to the bandwidth of the data transmission route being wider than a predetermined bandwidth, the cooperation base station 220 may generate long-term CSI or short-term CSI indicating a detailed channel state as the feedback information.

Conversely, in response to the bandwidth of the data transmission route being narrower than the predetermined bandwidth, the cooperation base station 220 may generate long-term PMI or short-term PMI as the feedback information. The long-term PMI or the short-term PMI may be determined based on a channel state.

According to another embodiment, the cooperation base station 220 may generate the feedback information base on a computational capability of the serving base station 230. The serving base station 230 may perform a complicated calculation to determine the operation mode with respect to the second terminal 240.

In response to the serving base station 230 having a sufficient computational capability for performing the complicated calculation, the cooperation base station 220 may generate detailed CSI as the feedback information. Short-term CSI or long-term CSI, as an example, may be used as the detailed CSI.

In response to the serving base station 230 having an insufficient computational capability for performing the complicated calculation, the cooperation base station 230 may simplify CSI received from the first terminal 210 to generate the feedback information. Short-term PMI or long-term PMI, as an example, may be used as the simplified CSI.

According to an embodiment, the cooperation base station 220 may classify the serving base station 230 into one cooperation level among a plurality of cooperation levels based on information associated with the data transmission route between the cooperation base station 220 and the serving base station 230, or based on information associated with a computational capability of the serving base station 230. The cooperation base station 220 may generate feedback information based on the cooperation level of the serving base station 230 to determine the operation mode.

In response to a bandwidth of the data transmission route between the serving base station 230 and the cooperation base station 220 being wide, the transmission delay being relatively short, or the serving base station 230 having a high computational capability, the serving base station 230 may have a high cooperation level. In this case, the cooperation base station 230 may generate the detailed CSI as the feedback information. The cooperation base station 230 may generate the feedback information based on a latest channel state.

In operation 271, the cooperation base station 220 may transmit the feedback information to the serving base station 230.

In operation 280, the serving base station 230 may determine the operation mode with respect to the second terminal 240 based on the feedback information. The operation mode may apply various interference control schemes. For example, the serving base station 230 may determine an operation mode of applying a MIMO scheme to the second terminal 240, or may determine an operation mode of applying a DSM scheme. Also, the serving base station 230 may determine an operation mode of simultaneously applying the MIMO scheme and the DSM scheme to the second terminal 240.

The feedback information may be generated based on the cooperation level of the serving base station 230 and thus, the operation mode with respect to the second terminal 240 may be determined based on the cooperation level of the serving base station 230. In response to the cooperation level of the serving base station 230 being high, the operation mode of simultaneously applying the MIMO scheme and the DSM scheme to the second terminal may be determined In response to the cooperation level being low, an operation of applying one of the MIMO scheme and the DSM scheme to the second terminal may be determined.

In operation 260, in response to the cooperation base station 220 generating the detailed CSI as the feedback information, the serving base station 230 may perform scheduling of the first terminal 210 or the second terminal 240 based on an accurate algorithm.

In operation 260, in response to the cooperation base station 220 generating approximate CSI as the feedback information, the serving base station 230 may perform scheduling of the first terminal 210 or the second terminal 240 based on a simple algorithm.

In operation 280, the operation mode determined by the serving base station 230 may be an operation mode of minimizing an effect of interference to the first terminal.

In operation 290, the serving base station 230 may transmit data to the second terminal 240 based on the determined operation mode. A signal transmitted by the serving base station 230 may be transmitted to the first terminal 210, and the interference to the first terminal 210 may be minimized.

The serving base station 230 may update the operation mode with respect to the terminal 240 based on a change in a channel state in operation 290. The serving base station 230 may update a precoding vector or may update a transmission power according to the update of the operation mode.

According to an embodiment, the serving base station 230 may control a period of applying the MIMO scheme or the DSM scheme based on the feedback information or the cooperation level of the serving base station 230.

Figure 3A:
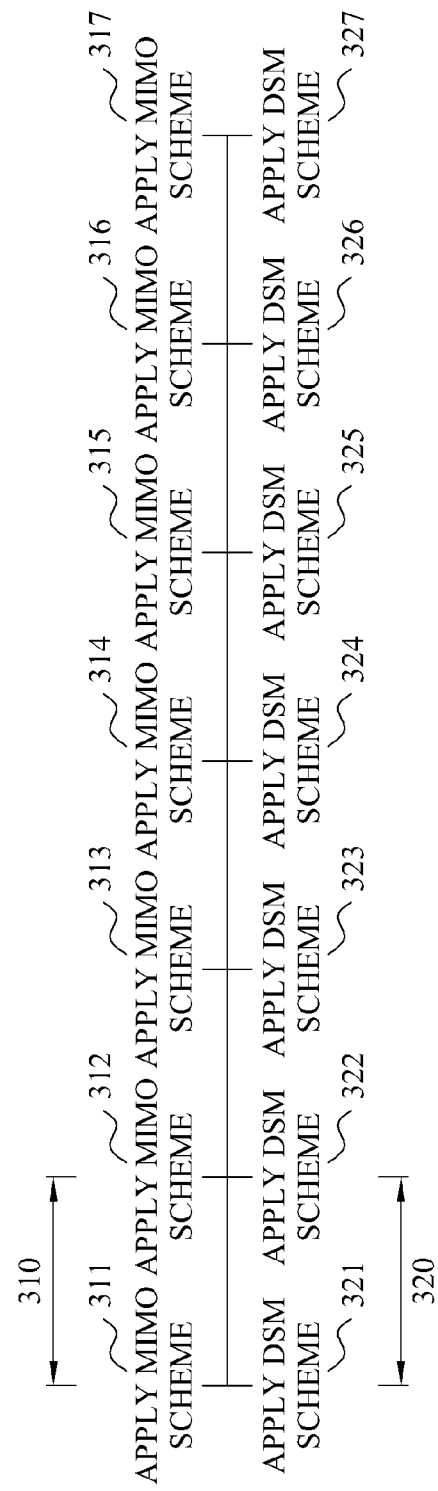
FIGS. 3A and 3B are flowcharts illustrating examples of controlling a period of applying a multiple input multiple output (MIMO) scheme and a dynamic spectrum management (DSM).
Figure 3B:
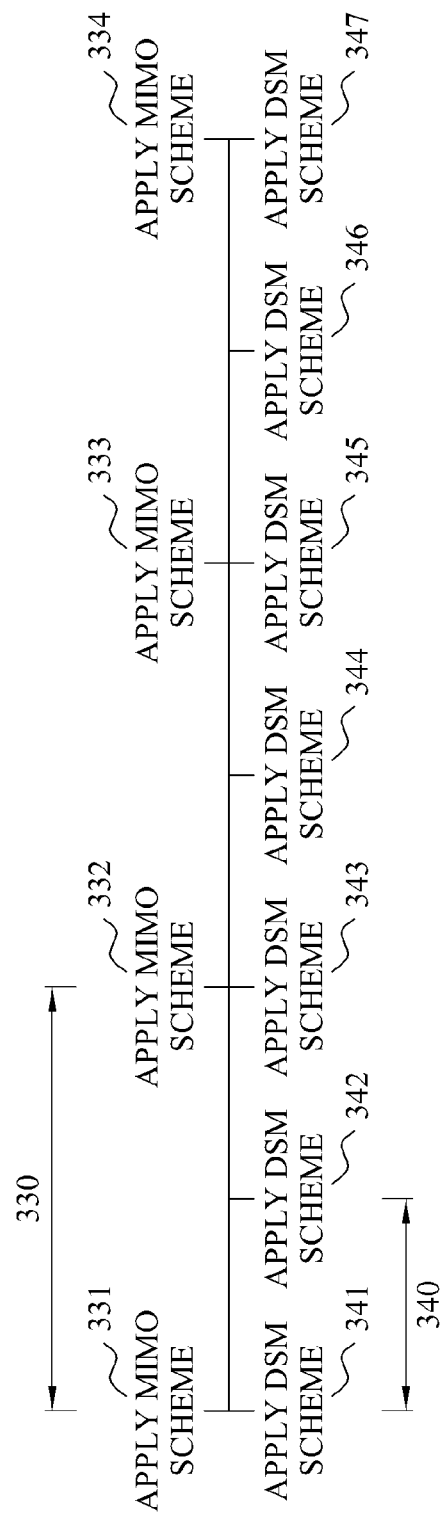

FIGS. 3A and 3B illustrate examples of controlling a period of applying a MIMO scheme and a DSM scheme.

A serving base station may perform a predetermined calculation to select a terminal that may receive data based on the MIMO scheme or to select a terminal that may receive data based on the DSM scheme. For example, it may be presumed that an amount of calculation resources used for selecting the terminal that may receive the data based on the MIMO scheme is greater than an amount of calculation resources used for selecting the terminal that may receive the data based on the DSM scheme.

FIG. 3A illustrates an example in which a period 310 of applying the MIMO scheme is identical to a period 320 of applying the DSM scheme.

In response to a computational capability of the serving base station being greater than a predetermined computational capability, the serving base station may set the period 310 of applying the MIMO scheme to be identical to the period 320 of applying the DSM scheme.

Referring to FIG. 3A, in operation 321, the serving base station may select terminals that may receive data based on the MIMO scheme at a first timepoint in operation 311, and may select terminals that may receive data based on the DSM scheme at the first timepoint. According to an embodiment, the serving base station may select, from among terminals to which the MIMO scheme is applied, a terminal to which the DSM scheme to be applied.

The serving base station may select terminals to which the MIMO scheme is applied at a second timepoint in operation 312, and may select terminals to which the DSM scheme is applied at the second time point in operation 322.

Referring to FIG. 3A, the serving base station may select the terminal to which the MIMO scheme is applied or the terminal to which the DSM scheme is applied, at each period. The serving base station may update a precoding vector or may update a transmission power of each terminal, at each period.

FIG. 3B illustrates an example in which a period 330 of applying the MIMO scheme is different from a period 340 of applying the DSM scheme.

Referring to FIG. 3B, the serving base station may select terminals that may receive data based on the MIMO scheme at the first timepoint in operation 331, and the serving base station may select terminals that may receive data based on the DSM scheme at the first timepoint in operation 341.

The serving base station may reselect terminals that may receive data based on the DSM scheme at the second timepoint in operation 342. According to an embodiment, the serving base station may select, from among selected terminals to which the MIMO scheme is applied at the first timepoint, a terminal to which the DSM scheme to be applied at the second timepoint.

The serving base station may select, as the MIMO scheme to be applied to the terminals, one MIMO scheme from among various MIMO schemes, such as an interference alignment scheme, a random beamforming scheme, and a PMI based beamforming scheme.

Referring to FIG. 3B, the serving base station may not regularly select the terminals to which the MIMO scheme is applied at each period or may not always update a precoding vectors of the selected terminals. Therefore, a serving base station that has insufficient computational capability may simultaneously apply the MIMO scheme and the DSM scheme.

The serving base station may control a period of applying the MIMO scheme and the DSM scheme based on the computational capability of the serving base station.

FIG. 3B illustrates an example in which the DSM scheme is applied twice while the MIMO scheme is applied once. According to another embodiment, the serving base station may control a period of applying the DSM scheme based on a channel state. The serving base station may apply the DSM scheme once while the MIMO scheme is applied once or may apply the DSM scheme three times or more while the MIMO scheme is applied once. The period may be controlled based on the channel state, and thus, a number of unnecessary operations may be reduced and data transmission efficiency may be improved or maximized.

Although FIG. 3B illustrates an example in which the DSM scheme is more frequently applied than the MIMO scheme, the serving base station may more frequently apply the MIMO scheme than the DSM scheme based on the channel state, computational capability of the serving base station, and the like.

Figure 4:
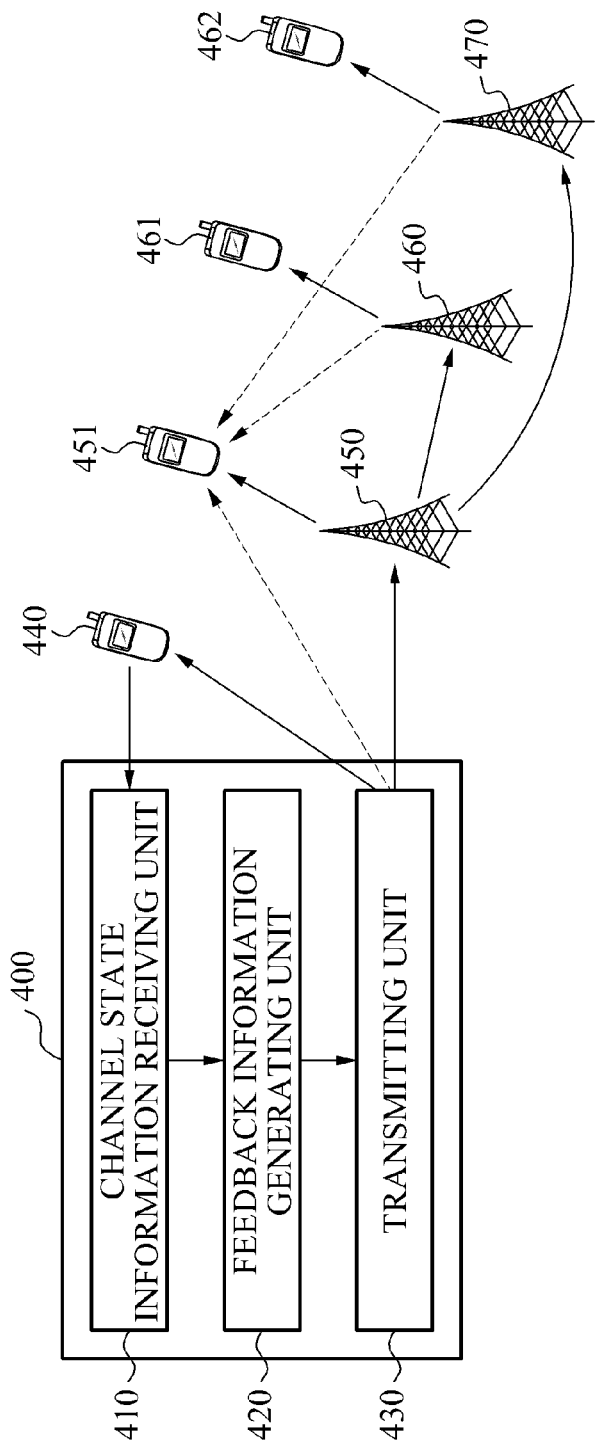
FIG. 4 is a block diagram illustrating an example of a cooperation base station.

FIG. 4 illustrates an example of a cooperation base station 400.

The cooperation base station 400 may include a channel state information receiving unit 410, a feedback information generating unit 420, and a transmitting unit 430.

The channel state information receiving unit 410 may receive, from a first terminal 440, CSI between the cooperation base station 400 and the first terminal 440. According to an embodiment, the cooperation base station 400 may transmit a pilot signal to the first terminal 400, and the first terminal 440 may estimate the channel state between the first terminal 440 and the cooperation base station 400 based on the pilot signal.

According to an embodiment, the channel state information receiving unit 410 may receive, from the first terminal 440, CSI between a serving base station 450 and the first terminal 440.

The feedback information generating unit 420 may generate feedback information based on the CSI.

The feedback information generating unit 420 may generate feedback information associated with the first terminal 440 based on information associated with a data transmission route between the cooperation base station 400 and the serving base station 450.

The information associated with the data transmission route may include a bandwidth of the data transmission route between the cooperation base station 400 and the serving base station 450 or may include transmission delay information of the data transmission route.

For example, when the data transmission route between the cooperation base station 400 and the serving base station 450 is physically connected, such as with a wire or a cable, e.g., an optical fiber cable, the bandwidth of the data transmission route may be significantly wide.

In response to the data transmission route being physically connected, e.g., by the optical fiber cable, the feedback information generating unit 420 may generate detailed CSI (e.g., long-term CSI or short-term CSI) associated with the first terminal 440 as the feedback information.

In response to the data transmission route between the cooperation base station 400 and the serving base station 450 being wirelessly connected, the bandwidth of the data transmission route may be narrower than a predetermined bandwidth. In this case, the feedback information generating unit 420 may generate simplified CSI (e.g, long-term PMI or short-term PMI) associated with the first terminal 440 as the feedback information. When the CSI is simplified, an amount of information may decrease. Accordingly, the cooperation base station 400 may conveniently transmit the feedback information to the serving base station 450 even though the bandwidth is relatively narrow.

In response to the data transmission route between the cooperation base station 400 and the serving base station 450 is physically connected, such as with a wire or cable, e.g., an optical fiber cable, a transmission delay of the data transmission route may be less than a predetermined delay. The feedback information associated with the first terminal 440 may be transmitted to the serving base station 450 with a relatively short transmission delay. The serving base station 450 may determine an operation mode with respect to a second terminal 451 based on the feedback information having the relatively short transmission delay. In this case, the serving base station 450 may determine the operation mode with respect to the second terminal based on an algorithm having a high complexity and a high performance. The serving base station 450 may determine an operation mode of accurately controlling interference to the second terminal 451 as the operation mode with respect to the second terminal 451.

In response to the data transmission route between the cooperation base station 400 and the serving base station 450 being wirelessly connected, the transmission delay of the data transmission route may be greater than the predetermined delay. The feedback information associated with the first terminal 440 may be transmitted to the serving base station 450 with a relatively long transmission delay. A channel state may be changed over time and thus, when the transmission delay of the feedback information is relatively long, the feedback information may not be accurate. In this case, the serving base station 450 may perform a simple calculation with respect to the second terminal 451 to determine the operation mode with respect to the second terminal 451.

According to another embodiment, the feedback information generating unit 420 may generate the feedback information based on a computational capability of the serving base station 450. In response to the computational capability of the serving base station 450 being sufficient, the cooperation base station 450 may generate the feedback information based on detailed channel information.

The transmitting unit 430 may transmit the feedback information to the serving base station 450. The serving base station 450 may determine the operation mode with respect to the second terminal 451 accessing the serving base station 450, based on the feedback information. The serving base station 450 and the cooperation base stations 400, 460, and 470 may transmit data based on the determined operation mode.

According to an embodiment, the cooperation base station 400 may classify the serving base station 450 into one cooperation level from among a plurality of cooperation levels, based on information associated with the data transmission route between the serving base station 450 and the cooperation base station 400. The cooperation base station 400 may classify the serving base station 450 into one cooperation level from among the plurality of cooperation levels, based on a computational capability of the serving base station 450.

The cooperation base station 400 may generate feedback information based on the cooperation level of the serving base station 450. In response to the bandwidth of the data transmission route being wide or the computational capability of the serving base station being sufficient, the cooperation level of the serving base station 450 may be high. In this case, the feedback information generating unit 420 may generate the feedback information based on the cooperation level of the serving base station 450.

The serving base station 450 may combine a MIMO scheme or a DSM scheme to determine the operation mode with respect to the second terminal. For example, the serving base station 450 may select terminals to which the MIMO scheme or the DSM scheme is applied from among a plurality of terminals 440, 451, 461, and 462. In this case, the MIMO scheme and the DSM scheme may be simultaneously applied to a predetermined terminal.

The serving base station 450 may apply an interference alignment scheme as one example of the MIMO scheme. Whether to apply the interference alignment scheme to a predetermined terminal may be determined based on a variety of channel information. Accordingly, the serving base station 450 may perform a great amount of calculations to apply the interference alignment scheme.

The feedback information generating unit 420 may generate the feedback information based on the computational capability of the serving base station 450. In response to the computational capability of the serving base station 450 being greater than a predetermined computational capability, the serving base station 450 may determine the operation mode with respect to the second terminal 451 based on accurate channel information associated with each of the terminals 440, 461, and 462. The serving base station 450 may determine, as the operation mode with respect to the second terminal 451, an operation mode of accurately controlling interference to the second terminal 451, based on the accurate channel information associated with each of the terminals 440, 461, and 462.

In response to the computational capability of the serving base station 450 being less than the predetermined computational capability, the serving base station 450 may not accurately control interference to the second terminal 451. In this case, the feedback information generating unit 420 may generate simplified channel information as the feedback information. For example, the feedback information generating unit 420 may generate a codebook-based precoding matrix index (PMI) as the feedback information.

A femto base station that may transmit data based on a portion of radio resources among radio resources allocated to a master base station may be the cooperation base station. In this case, the master base station may operate as the serving base station.

According to another embodiment, the femto base station may operate as the serving base station and the master base station may operate as the cooperation base station.

Figure 5:
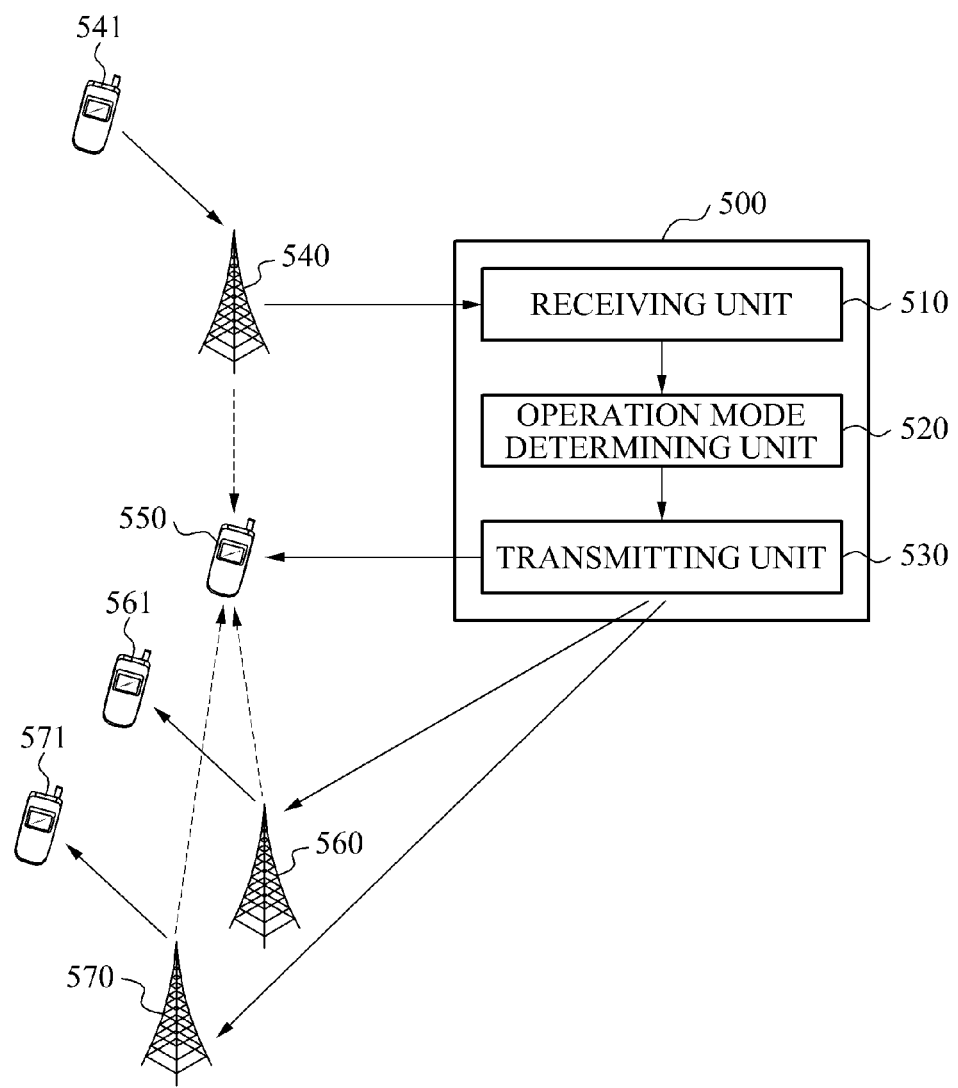
FIG. 5 is a block diagram illustrating an example of a serving base station.

FIG. 5 illustrates an example of a serving base station 500. The serving base station 500 may include a receiving unit 510, an operation mode determining unit 520, and a transmitting unit 530.

The receiving unit 510 may receive, from a cooperation base station 540 adjacent to the serving base station 500, feedback information associated with a first terminal 541 accessing the cooperation base station 540. The feedback information may be generated based on information associated with a data transmission route between the serving base station 500 and the cooperation base station 540. The information associated with the data transmission route may include information associated with a bandwidth of the data transmission route between the cooperation base station 540 and the serving base station 500 or transmission delay information associated with the data transmission route.

According to an embodiment, in response to the bandwidth of the data transmission route being narrower than a predetermined bandwidth, the feedback information may be a codebook-based PMI (e.g., long-term PMI or short-term PMI) of the first terminal.

According to another embodiment, in response to a transmission delay of the data transmission route being less than a predetermined delay, the feedback information may be short-term CSI or short-term PMI that reflects a latest channel state of a channel between the first terminal and the cooperation base station 540.

According to an embodiment, the cooperation base station 540 may periodically generate the feedback information associated with the first terminal 541. The cooperation base station 540 may average the periodically generated feedback information for a predetermined amount of time, and may transmit the averaged feedback information to the serving base station 500.

In response to the transmission delay of the data transmission route being greater than the predetermined delay or the bandwidth of the data transmission route is narrower than the predetermined bandwidth, the cooperation base station 540 may average the feedback information for more than a predetermined amount of time, and may transmit the average feedback information to the serving base station. The transmitted feedback information is referred to as a long-term feedback information. In response to the generated feedback information being a codebook-based PMI of the first terminal, the serving base station 500 may receive a long-term PMI from the cooperation base station 540. In response to the generated feedback information being CSI, the serving base station 500 may receive a long-term CSI from the cooperation base station.

According to another embodiment, in response to the transmission delay of the data transmission route being less than the predetermined delay or the bandwidth of the data transmission route is wider than the predetermined bandwidth, the cooperation base station may average the feedback information for less than the predetermined amount of time, and may transmit the average feedback information to the serving base station 500. The feedback information may be referred to as short-term feedback information. Accordingly, the serving base station 500 may more frequently receive the feedback information from the cooperation base station. In response to the generated feedback information being the codebook-based PMI of the first terminal, the serving base station 500 may receive the short-term PMI from the cooperation base station. When the generated feedback information is the CSI associated with the first terminal, the serving base station 500 may receive the short-term CSI from the cooperation base station.

The operation mode determining unit 520 may determine an operation mode with respect to a second terminal 550 accessing the serving base station 500. The operation mode determining unit 520 may combine various interference control schemes to determine the operation mode with respect to the second terminal. A MIMO scheme or a DSM scheme may be used as one example of the various interference control schemes.

According to an embodiment, the serving base station 500 may be classified into one cooperation level from among a plurality of cooperation levels, based on the bandwidth of the data transmission route, the transmission delay of the data transmission route, a computational capability of the serving base station 500, and the like. In response to the bandwidth of the data transmission route being wide, the transmission delay of the data transmission route being relatively short, and the computational capability being sufficient, a cooperation level of the serving base station 500 is high, whereas, in response to one of the conditions not being satisfied, the cooperation level of the serving base station may be low. In this case, the receiving unit 610 may receive feedback information generated based on the cooperation level, and the operation mode determining unit 520 may determine an operation mode with respect to the second terminal 550 based on the cooperation level of the serving base station 500.

In response to the feedback information received by the receiving unit 510 being simplified CSI such as the codebook-based PMI of the first terminal 541, the serving base station 500 may not accurately control interference to the second terminal 550. In this case, the operation mode determining unit 520 may perform a simple calculation to determine the operation mode with respect to the second terminal 550.

According to an embodiment, the cooperation base station 540 may be a femto base station installed in an ordinary household, and may access a network or release from the network based on a communication state of each base station. The cooperation base station 540 may not constantly access the network, and may temporarily access the network depending on an amount of data transmission.

In response to the cooperation base station 540 newly accessing the network, the receiving unit 510 may receive information associated with a data transmission route between the cooperation base station 540 and a serving base station 600 or may receive information associated with a cooperation level of the cooperation base station 540 from the cooperation base station 540, and may determine the operation based on the received information associated with the data transmission route or the received information associated with the cooperation level.

According to an embodiment, a transmitting unit 630 may transmit a predetermined measurement signal to the cooperation base station 540 via the data transmission route. The cooperation base station 540 may transmit a response signal to the serving base station 500 in response to the measurement signal. The receiving unit 510 may receive a response signal, and may calculate a transmission delay between the cooperation base station 540 and the serving base station 510.

The operation mode determining unit 520 may determine a period of applying an interference alignment scheme or a period of applying a DSM scheme based on the information associated with the data transmission route. For example, in response to a bandwidth of the data transmission route being relatively narrow, the receiving unit 510 may receive simplified channel information as the feedback information. In this case, the operation mode determining unit 520 may select terminals that may receive data, based on the simplified algorithm, and may control interference to the selected terminals. The operation mode determining unit 520 may control interference to the terminal based on the MIMO scheme or the DSM scheme.

In response to the simple algorithm being used, the operation mode determining unit 520 may set a period of applying the MIMO scheme to be identical with a period of applying the DSM scheme. Even when the transmission delay of the data transmission route is relatively long, the operation mode determining unit 520 may set the period of applying the MIMO scheme to be identical with the period of applying the DSM scheme.

According to an embodiment, a plurality of terminals may access the serving base station 500. The operation mode determining unit 520 may select, from among the plurality of terminals, a terminal that may receive data, based on the feedback information. The operation mode determining unit 520 may combine the MIMO scheme or the DSM scheme to determined the operation mode with respect to the selected terminal The transmitting unit 530 may transmit data to the second terminal 550 according to the determined operation mode.

According to an embodiment, a femto base station that transmits data based on a portion of radio resources from among radio resources allocated to a master base station may be the cooperation base station. In this case, the master base station may operate as the serving base station.

According to another embodiment, the femto base station may operate as the serving base station and the master base station may operate as the cooperation base station.

Figure 6:
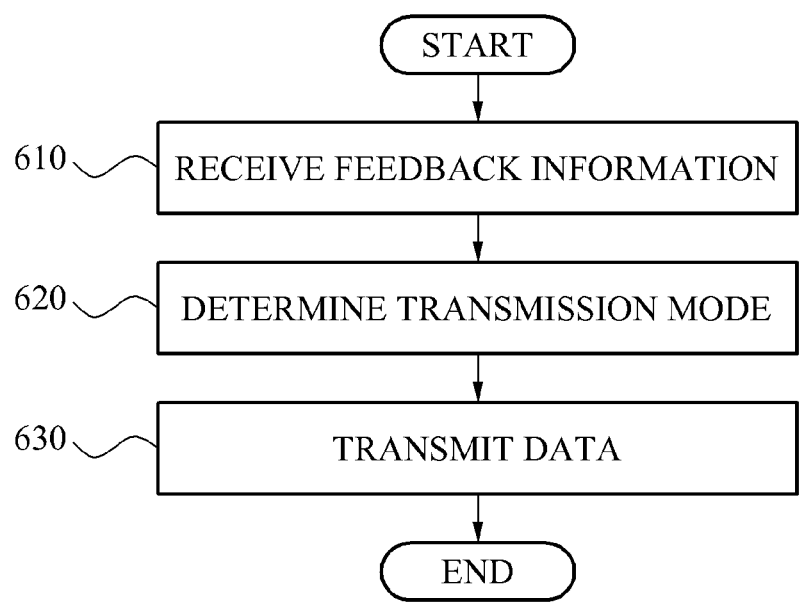
FIG. 6 is a flowchart illustrating an example of a data transmission method.

FIG. 6 illustrates an example of a data transmission method.

In operation 610, a serving base station may receive feedback information from a cooperation base station. The feedback information may be generated based on information associated with a data transmission route between the serving base station and the cooperation base station. For example, in response to a bandwidth of the data transmission route between the serving base station and the cooperation base station being greater than a predetermined bandwidth, the feedback information may be detailed CSI (e.g., long-term CSI or short-term CSI) associated with a first terminal accessing the cooperation base station. Conversely, in response to the bandwidth of the data transmission route being less than the predetermined bandwidth, the feedback information may be simplified CSI (e.g., long-term PMI or short-term PMI). According to another embodiment, in response to a transmission delay of the data transmission route being greater than a predetermined delay, the feedback information may be CSI (e.g., short-term CSI or short-term PMI) generated based on a latest channel state.

According to another embodiment, in response to a computational capability of the serving base station being less than or equal to a predetermined computational capability, the feedback information may be simplified CSI. Conversely, in response to the computational capability of the serving base station being greater than the predetermined computational capability, the feedback information may be detailed CSI.

According to an embodiment, the serving base station may be classified into one cooperation level from among a plurality of cooperation levels, based on the bandwidth of the data transmission route, the transmission delay of the data transmission route, the computational capability of the serving base station, and the like. For example, in response to the bandwidth of the data transmission route being wide, the transmission delay of the data transmission route being small, and the computational capability being sufficient, the cooperation level of the serving base station may be high, whereas, in response to one of the conditions not being satisfied, the cooperation level of the serving base station may be low. In this case, the feedback information may be generated based on the cooperation level of the serving base station.

In operation 620, the serving base station may determine an operation mode with respect to a second terminal accessing the serving base station based on the feedback information.

In response to the feedback information being simplified CSI, the serving base station and the cooperation base station may not accurately control interference to the second terminal. In this case, the serving base station may determine the operation mode with respect to the second terminal based on a simple algorithm.

In response to the feedback information being detailed CSI, the serving base station and the cooperation base station may accurately control interference to the second terminal In this case, the serving base station may determine, as an optimal operation mode, an operation that may minimize an effect of interference to the second terminal based on a complex algorithm.

According to an embodiment, a plurality of terminals may access the serving base station. The serving base station may calculate an effect of interference to each of the plurality of terminals when transmission is performed based on each operation mode. The serving base station may select a terminal that may receive data from among the plurality of terminals based on the effect of interference to each terminal and may select an operation mode with respect to the selected terminal.

The serving base station may combine various interference control schemes to determine an operation mode with respect to the terminal For example, the serving base station may determine an operation of only applying a MIMO scheme to the terminal or may determine an operation of only applying a DSM scheme. Also, the serving base station may determine an operation of simultaneously applying the MIMO scheme and the DSM scheme to the terminal.

In operation 630, the serving base station and the cooperation base station may transmit data to the second terminal based on the operation mode.

The serving base station may update an interference control scheme applied to each operation mode. The serving base station may select a terminal that may receive data according to a change in a channel, at regular periods.

The serving base station may compare an amount of calculation required for applying each interference control scheme with a computational capability of the serving base station, and may control a period of applying each interference control scheme based on a comparison result.

For example, in response to the computational capability of the serving base station being insufficient compared with an amount of calculation used for applying the MIMO scheme, the serving base station may increase a period of applying the MIMO scheme.

The serving base station may control a period of applying each interference control scheme based on the cooperation level of the serving base station. In response to a transmission delay of the data transmission route being relatively long, the cooperation level of the serving base station may be relatively low. In this case, the serving base station may increase the period of applying the MIMO scheme or the period of applying the DSM scheme.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A base station, comprising:
   a feedback information generating unit configured to generate feedback information associated with a first terminal accessing the base station based on a cooperation level, from among a plurality of cooperation levels, of a neighboring base station; and
   a transmitting unit configured to transmit the feedback information to the neighboring base station, wherein
   the cooperation level of the neighboring base station is based on at least one of information about a communication connection between the base station and a neighboring base station or a computational capability of the neighboring base station.

2. The base station of claim 1, wherein the information associated with the communication connection comprises:
   information associated with a bandwidth of the communication connection between the base station and the neighboring base station; or
   transmission delay information associated with the communication connection.

3. The base station of claim 2, wherein the feedback information generating unit is further configured to generate a codebook-based precoding matrix index (PMI) of the first terminal as the feedback information if the bandwidth is narrower than a predetermined bandwidth.

4. The base station of claim 2, wherein the feedback information generating unit is further configured to generate channel state information (CSI) associated with the first terminal as the feedback information if the bandwidth is wider than a predetermined bandwidth.

5. The base station of claim 2, wherein the feedback information generating unit is further configured to generate a codebook-based precoding matrix index (PMI) of the first terminal as the feedback information if the computational capability of the neighboring base station is less than a predetermined capability.

6. The base station of claim 2, wherein the feedback information generating unit is further configured to generate channel state information (CSI) associated with the first terminal as the feedback information if the computational capability of the neighboring base station is greater than or equal to a predetermined capability.

7. The base station of claim 1, wherein the base station comprises a femto base station configured to transmit data to the first terminal based on a portion of radio resources among radio resources allocated to the neighboring base station.

8. The base station of claim 1, wherein the neighboring base station comprises a femto base station configured to transmit data to a second terminal based on a portion of radio resources among radio resources allocated to the base station.

9. A base station, comprising:
   a receiving unit configured to receive, from a neighboring base station, feedback information associated with a first terminal accessing the neighboring base station based on a cooperation level, from among a plurality of cooperation levels, of the base station;
   an operation mode determining unit configured to determine an operation mode of a second terminal accessing the base station based on the feedback information; and a transmitting unit configured to transmit data to the second terminal based on the determined operation mode, wherein the cooperation level of the neighboring base station is based on at least one of information about a communication connection between the neighboring base station and the base station or a computational capability of the base station.

10. The base station of claim 9, wherein the information about the communication connection comprises:

information associated with a bandwidth of a communication connection between the neighboring base station and the base station; or transmission delay information associated with the communication connection.

11. The base station of claim 10, wherein the feedback information is generated by averaging information associated with the first terminal for more than a predetermined amount of time if a transmission delay is less than a predetermined delay.

12. The base station of claim 10, wherein the feedback information is generated by averaging information associated with the first terminal for less than a predetermined amount time if a transmission delay is greater than a predetermined delay.

13. The base station of claim 10, wherein the feedback information comprises a codebook-based precoding matrix index (PMI) of the first terminal if the bandwidth is narrower than a predetermined bandwidth.

14. The base station of claim 10, wherein the feedback information comprises channel state information (CSI) associated with the first terminal if the bandwidth is wider than a predetermined bandwidth.

15. The base station of claim 9, wherein the operation mode determining unit is configured to apply an interference control scheme for the transmission of the data to the second terminal.

16. The base station of claim 15, wherein the interference control scheme comprises a multiple input multiple output (MIMO) scheme or a dynamic spectrum management (DSM) scheme.

17. The base station of claim 16, wherein the operation mode determining unit is further configured to control a period of applying the MIMO scheme and DSM scheme based on at least one of the information about the communication connection and the computational capability.

18. The base station of claim 9, wherein the operation mode determining unit is further configured to select, based on the feedback information, a terminal to receive the data from among a plurality of second terminals.

19. The base station of claim 9, wherein the receiving unit is further configured to receive, from the neighboring base station, at least one of the information about the communication connection and information associated with a cooperation level of the neighboring base station.

20. A method of transmitting data, the method comprising:

receiving, from a neighboring base station, feedback information associated with a first terminal accessing the neighboring base station, based on a cooperation level, from among a plurality of cooperation levels, of a base station;

determining an operation mode with respect to a second terminal accessing the base station, based on the feedback information; and transmitting data to the second terminal based on the operation mode, wherein the cooperation level of the neighboring base station is determined based on at least one of information about a communication connection between the neighboring base station and the base station or a computational capability of the base station.

21. The method of claim 20, wherein the information about the communication connection comprises:

information associated with a bandwidth of a communication connection between the neighboring base station and the base station; or transmission delay information associated with the communication connection.

22. The method of claim 21, wherein the feedback information comprises a codebook-based precoding matrix index (PMI) of the first terminal if the bandwidth is narrower than a predetermined bandwidth.

23. The method of claim 21, wherein the feedback information comprises channel state information (CSI) associated with the first terminal if the bandwidth is wider than a predetermined bandwidth.

24. The method of claim 20, wherein the operation mode applies an interference control scheme for transmitting the data to the second terminal.

25. The method of claim 24, wherein the interference control scheme comprises a multiple input multiple output (MIMO) scheme or a dynamic spectrum management (DSM) scheme.

26. The method of claim 25, wherein the transmitting comprises controlling a period of applying the MIMO scheme or the DSM scheme based on at least one of the information about the communication connection and the computational capability.

27. The method of claim 20, wherein the determining comprises selecting a terminal to receive the data from among a plurality of second terminals, based on the feedback information.

28. A base station, comprising:

a feedback generator configured to generate feedback information about a first terminal accessing the base station based on a determined cooperation level, from among a plurality of cooperation levels, of a neighboring base station; and a transmitter configured to transmit the generated feedback information about the first terminal to the neighboring base station, wherein the cooperation level of the neighboring base station is determined, from among the plurality of cooperation levels, based on at least one of information about a communication connection between the base station and a neighboring base station and a computational capability of the neighboring base station.

* * * * *